US011646527B2

(12) United States Patent
Masatoshi et al.

(10) Patent No.: US 11,646,527 B2
(45) Date of Patent: May 9, 2023

(54) ELECTRIC TOOL

(71) Applicant: Nanjing Chervon Industry Co., Ltd., Nanjing (CN)

(72) Inventors: Fukinuki Masatoshi, Nanjing (CN); Xiang Zhao, Nanjing (CN); Muyang Ni, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 292 days.

(21) Appl. No.: 17/207,310

(22) Filed: Mar. 19, 2021

(65) Prior Publication Data

US 2021/0359461 A1   Nov. 18, 2021

(30) Foreign Application Priority Data

May 18, 2020   (CN) .......................... 202010420638.6

(51) Int. Cl.
*H01M 50/20* (2021.01)
*H01R 13/533* (2006.01)
*H01M 50/247* (2021.01)
*H01M 50/244* (2021.01)
*H01M 50/547* (2021.01)
(Continued)

(52) U.S. Cl.
CPC ............ *H01R 13/533* (2013.01); *B25F 5/02* (2013.01); *H01M 50/204* (2021.01); *H01M 50/244* (2021.01); *H01M 50/247* (2021.01); *H01M 50/547* (2021.01); *H01R 13/5025* (2013.01); *H01R 13/631* (2013.01); *B24B 23/028* (2013.01); *B24B 47/12* (2013.01); *H01M 2220/30* (2013.01)

(58) Field of Classification Search
CPC ...... H01R 13/533; H01R 13/53; H01R 13/46; H01R 13/5025; H01R 13/631; H01R 13/629; H01R 13/62; H01M 50/247; H01M 50/244; H01M 50/547; H01M 50/204; H01M 50/20; H01M 2220/30; B25F 5/02; B24B 23/028; B24B 47/12
See application file for complete search history.

(56) References Cited

U.S. PATENT DOCUMENTS 6,729,413 B2 * 5/2004 Turner ...................... B25F 5/02
173/217
7,429,430 B2 * 9/2008 Mooty ................... B23D 51/01
30/500

(Continued)

*Primary Examiner* — Harshad C Patel
(74) *Attorney, Agent, or Firm* — Greenberg Traurig, LLP (57) ABSTRACT

An electric tool includes a body, a battery pack, and a guide portion including a primary guide unit and a secondary guide unit. The primary guide unit and the secondary guide unit each extend in a preset direction and the primary guide unit and the secondary guide unit each are arranged in the longitudinal direction between a connecting portion of the battery pack and a mounting portion of the body. The primary guide unit and the secondary guide unit implement rigid mating. The primary guide unit includes primary mating surfaces mating with each other in the transverse direction, the secondary guide unit includes secondary mating surfaces mating with each other in the transverse direction, and a ratio of a width of a transverse gap between the primary mating surfaces to a width of a transverse gap between the secondary mating surfaces is greater than or equal to 0.3.

12 Claims, 7 Drawing Sheets

(51) Int. Cl.
    *H01M 50/204*     (2021.01)
    *B25F 5/02*     (2006.01)
    *H01R 13/502*     (2006.01)
    *H01R 13/631*     (2006.01)
    *B24B 23/02*     (2006.01)
    *B24B 47/12*     (2006.01)

(56) References Cited

U.S. PATENT DOCUMENTS

| | | | | |
|---|---|---|---|---|
| 8,389,143 B2* | 3/2013 | Roβkamp | ............ | A01G 3/053 |
| | | | | 429/100 |
| 8,557,427 B2* | 10/2013 | Matsumoto | ............ | B25F 5/02 |
| | | | | 429/151 |
| 9,318,729 B2* | 4/2016 | Ogura | ............ | H01M 50/50 |
| 9,412,982 B2* | 8/2016 | Naito | ............ | H01M 50/213 |
| 9,577,228 B2* | 2/2017 | Naito | ............ | H01M 50/50 |
| 9,774,017 B2* | 9/2017 | Uchida | ............ | H01M 50/213 |
| 9,847,517 B2* | 12/2017 | Baumgartner | ............ | H02J 7/00 |
| 9,954,418 B2* | 4/2018 | Kawakami | ............ | B24B 23/028 |
| 10,263,228 B2* | 4/2019 | Nishikawa | ............ | B25F 5/006 |
| 10,707,458 B2* | 7/2020 | Zahn | ............ | H01M 50/213 |
| 10,797,281 B2* | 10/2020 | Dietel | ............ | B25F 5/00 |
| 11,104,023 B2* | 8/2021 | Kamiya | ............ | B23D 45/16 |
| 11,183,857 B2* | 11/2021 | Aoki | ............ | H01M 50/296 |
| 2001/0000945 A1* | 5/2001 | Watson | ............ | H01M 50/213 |
| | | | | 320/114 |
| 2015/0249237 A1* | 9/2015 | Naito | ............ | H01R 12/58 |
| | | | | 429/7 |
| 2015/0303417 A1* | 10/2015 | Koeder | ............ | H01M 50/107 |
| | | | | 429/164 |
| 2017/0317322 A1* | 11/2017 | Milbourne | ............ | H01M 50/284 |
| 2018/0370014 A1* | 12/2018 | Roehm | ............ | B25F 5/02 |
| 2019/0044112 A1* | 2/2019 | Klee | ............ | H01M 10/4257 |
| 2019/0260209 A1* | 8/2019 | Nishikawa | ............ | H01M 50/247 |
| 2020/0139531 A1* | 5/2020 | Zahn | ............ | B25F 5/023 |
| 2020/0161609 A1* | 5/2020 | Murakami | ............ | H01M 50/256 |
| 2020/0212505 A1* | 7/2020 | Nakano | ............ | H02H 7/18 |
| 2021/0288370 A1* | 9/2021 | Rejman | ............ | H01M 50/22 |

* cited by examiner

ELECTRIC TOOL

RELATED APPLICATION INFORMATION

This application claims the benefit of CN 202010420638.6, filed on May 18, 2020, the disclosure of which is incorporated herein by reference in its entirety.

BACKGROUND

A direct-current electric tool is generally equipped with a battery pack for supplying power to the direct-current electric tool, and the battery pack is mating with a body by plugging. Since vibration is generated during the using process of the electric tool, relative movement between the battery pack and a main machine is inevitably caused, vibration noise is accordingly generated, and at the same time, the vibration of the machine affects the hand feeling of a user during usage. Moreover, since the battery pack and the main machine are generally in conductive contact with each other through terminals, wear of terminals is caused during the vibration due to friction between the conductive terminals of the main machine and the conductive terminals of the battery pack, and thereby poor contact or conductive failure is caused.

A mating gap generally exits at a place where the battery pack mates with the body. If the mating gap is too large, the reliability of mating is affected, which is not beneficial to shock absorption of the battery pack. If the mating gap is too small, the difficulty of assembly and disassembly of the battery pack is increased. Therefore, in the existing art, resilient washers of various structures are generally added at the place where the battery pack mates with the body as shock absorption units to compensate for the mating gap between the battery pack and the body or to reduce the vibration of the battery pack. However, the above shock absorption units generally need to be set individually and then be assembled with a housing, which increases the assembly process. Moreover, during long-term usage, the resilient washers wear relatively fast. Once the resilient washers are worn, the shock absorption effect and mating effect are greatly reduced. Therefore, how to effectively and conveniently achieve the shock absorption of the electric tool is a technical problem that needs to be solved in this field

SUMMARY

To solve deficiencies in the existing art, an object of the present disclosure is to provide an electric tool capable of improving shock absorption effect and reliability.

To achieve the object described above, the present disclosure provides the example solutions described below.

An electric tool includes a body, a battery pack and a guide portion.

The body includes a housing extending in a longitudinal direction and a mounting portion disposed on an end of the housing, where tool terminals are disposed on the mounting portion.

The battery pack includes a connecting portion and battery terminals disposed on the connecting portion, where each of the battery terminals is electrically connected to a respective one of the tool terminals when the battery pack is operated to be inserted into the mounting portion in a preset direction, and the battery terminals are arranged on a shell of the battery pack in a transverse direction perpendicular to the preset direction.

The guide portion is formed on the mounting portion and the connecting portion and is configured to guide the battery pack to be mounted on the mounting portion.

The guide portion includes a primary guide unit and a secondary guide unit, where the primary guide unit and the secondary guide unit each extend in the preset direction, and the primary guide unit and the secondary guide unit each are arranged in the longitudinal direction between the connecting portion and the mounting portion.

The primary guide unit and the secondary guide unit each are configured to implement rigid mating; the primary guide unit includes primary mating surfaces mating with each other in the transverse direction, the secondary guide unit includes secondary mating surfaces mating with each other in the transverse direction, and a ratio of a width of a transverse gap between the primary mating surfaces to a width of a transverse gap between the secondary mating surfaces is greater than or equal to 0.3.

Further, the ratio of the width of the transverse gap between the primary mating surfaces to the width of the transverse gap between the secondary mating surfaces is greater than or equal to 0.5.

Further, the primary guide unit and the secondary guide unit are made of a same material.

Further, a ratio of a weight of the battery pack to a width of a transverse mating gap is greater than or equal to 0.3 kg/mm and is smaller than or equal to 30 kg/mm.

Further, a ratio of a length of a plugging stroke of the battery pack in the preset direction to a width of the transverse mating gap is greater than or equal to 40 and is smaller than or equal to 700.

Further, one of the primary mating surfaces on the mounting portion and one of the secondary mating surfaces on the mounting portion are disposed on different planes, and one of the primary mating surfaces on the connecting portion and one of the secondary mating surfaces on the connecting portion are disposed on different planes.

Further, the primary guide unit includes a body male guide rail disposed on the mounting portion and a battery female guide rail disposed on the connecting portion.

The secondary guide unit includes a body female guide rail disposed on the mounting portion and a battery male guide rail disposed on the connecting portion.

Further, the body female guide rail includes a groove and a plurality of ribs spaced apart on a bottom wall of the groove, where each of the plurality of ribs extends in the longitudinal direction.

The electric tool further includes a resilient member disposed between the primary mating surfaces, where the resilient member is configured to limit displacement of the battery pack in a direction intersecting the preset direction.

An electric tool includes a body, a battery pack and a guide portion.

The body includes a housing extending in a longitudinal direction and a mounting portion disposed on an end of the housing, where tool terminals are disposed on the mounting portion.

The battery pack includes a connecting portion and battery terminals disposed on the connecting portion, where each of the battery terminals is electrically connected to a respective one of the tool terminals when the battery pack is operated to be inserted into the mounting portion in a preset direction, and the battery terminals are arranged on a shell of the battery pack in a transverse direction perpendicular to the preset direction.

The guide portion is formed on the mounting portion and the connecting portion and is configured to guide the battery pack to be mounted on the mounting portion.

The guide portion includes a primary guide unit and a secondary guide unit, where the primary guide unit and the secondary guide unit each extend in the preset direction, and the primary guide unit and the secondary guide unit each are arranged in the longitudinal direction between the connecting portion and the mounting portion.

The primary guide unit and the secondary guide unit each are configured to implement rigid mating; the primary guide unit includes primary mating surfaces mating with each other in the transverse direction, the secondary guide unit includes secondary mating surfaces mating with each other in the transverse direction, and a width of a transverse gap between the primary mating surfaces and a width of a transverse gap between the secondary mating surfaces each are greater than or substantially equal to 0 (i.e., as close to zero as possible given typical manufacturing tolerances) and are smaller than or equal to 1 mm.

Further, a ratio of the width of the transverse gap between the primary mating surfaces to the width of the transverse gap between the secondary mating surfaces is greater than or equal to 0.5.

Further, a ratio of a weight of the battery pack to a width of a transverse mating gap is greater than or equal to 0.3 kg/mm and is smaller than or equal to 30 kg/mm.

Further, a ratio of a length of a plugging stroke of the battery pack in the preset direction to a width of a transverse mating gap is greater than or equal to 40 and is smaller than or equal to 700. According to the electric tool provided by the present disclosure, the primary guide unit and the secondary guide unit are disposed between the body and the battery pack. The gap between the mating surfaces of the primary guide unit and the gap between the mating surfaces of the secondary guide unit are reasonably set according to the norms and the plugging stroke of the battery pack.

As will become apparent from the descriptions that follow, these various examples will function to ensure the reliability and convenience of assembling the battery pack and the body, the vibration of the battery pack in the using process will be effectively reduced, and the vibration noise will be reduced. In this manner, users can obtain better experience.

DETAILED DESCRIPTION

The present disclosure is described below in detail in conjunction with the drawings.

Figure 1:
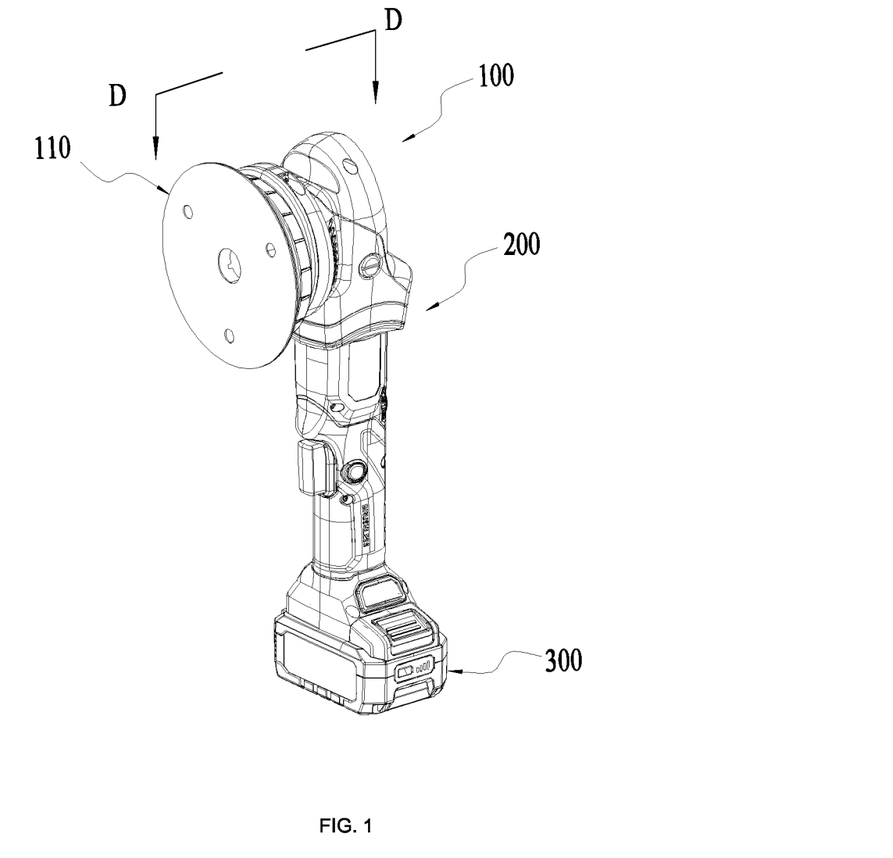
FIG. 1 is a structural view of a direct-current angle grinder according to the present disclosure.

FIG. 1 illustrates an example electric tool 100. The electric tool 100 in the present disclosure is specifically a handheld electric tool and includes a body 200 and a battery pack 300 detachably connected to the body 200. In the example, a direct-current angle grinder driven by a battery pack is taken as an example for description.

Although the example relates to a handheld electric tool, it should be understood that the prevent disclosure is not limited to the disclosed examples and is applicable to other types of electric tools including, but not limited to, for example, electric drills, screwdrivers, sanders and the like.

As shown in FIG. 1, the electric tool 100 in the example mainly includes an execution system 110, a power system, a transmission system, a fan assembly, a control system and the like, where the power system, the transmission system, the fan assembly, the control system and the like are disposed in a main body 200. The power system includes a motor. The motor drives the fan assembly to rotate and provides power for the execution system, and the transmission system transmits power from the power system to the execution system and may be a gear transmission system. The execution system includes a work attachment, and the work attachment in the example is a grinding disc used for grinding. The control system includes electronic elements such as a circuit board, a switch assembly, and the control system controls the execution system to work according to an action of the switch.

Figure 2:
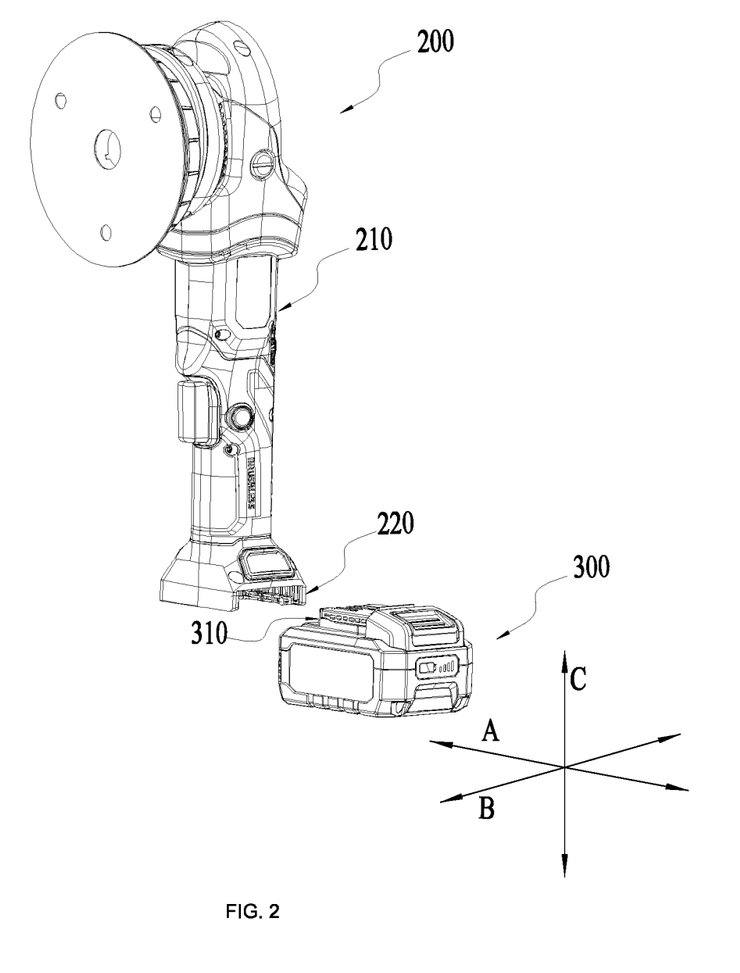
FIG. 2 is a schematic view illustrating a relationship between a battery pack and a body shown in FIG. 1.

As shown in FIG. 2, the body 200 includes a housing 210 extending in a longitudinal direction, the execution system is disposed on a longitudinal top end of the housing 210, and a mounting portion 220 is disposed on a longitudinal end of the housing 210. The mounting portion 220 is specifically an extending leg portion where the housing 210 is connected to the battery pack, and the battery pack 300 further includes a connecting portion 310 connected to the mounting portion 220.

Figure 6:
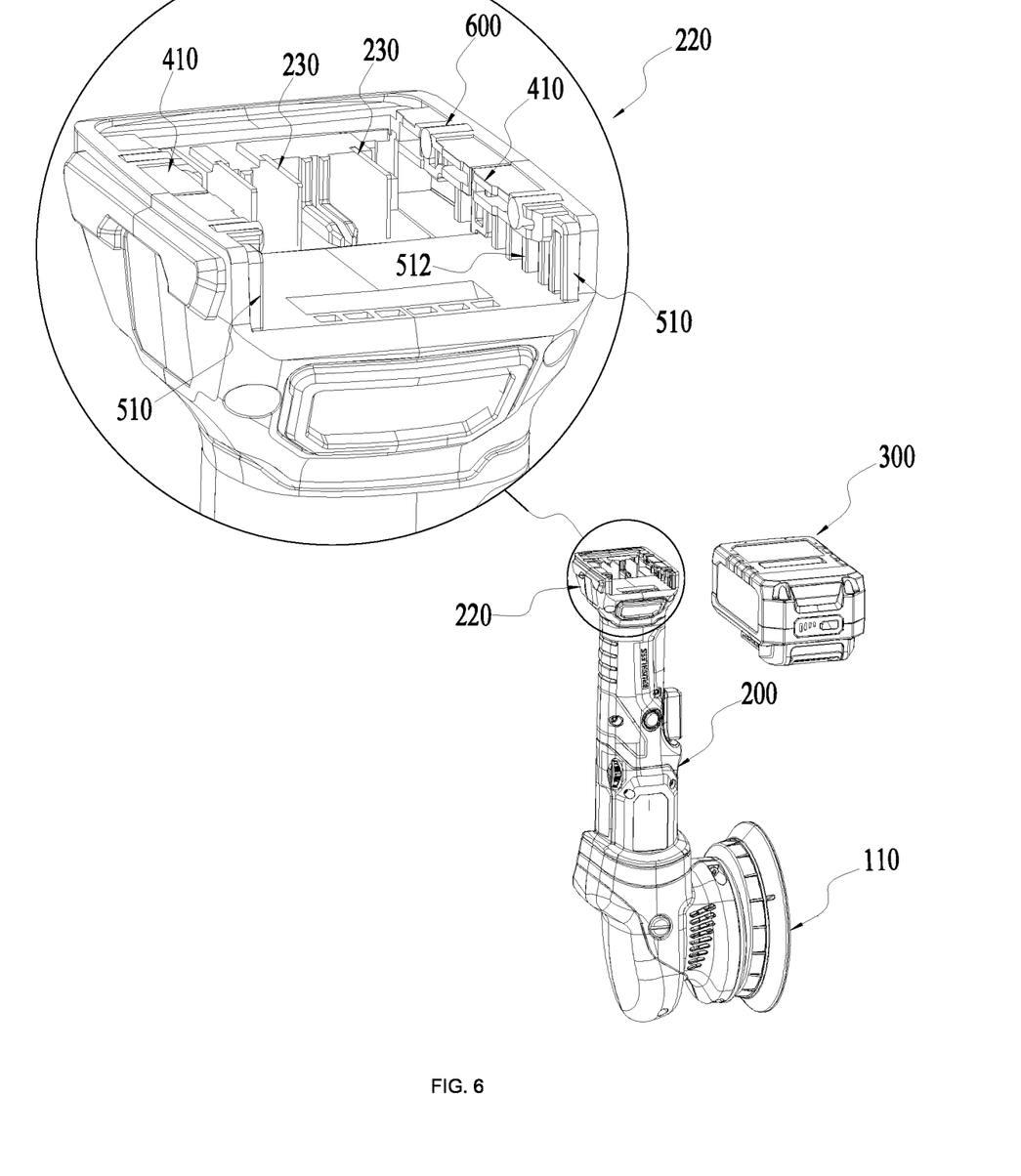
FIG. 6 is a structural view of a mounting portion of a body according to the present disclosure.
Figure 8:
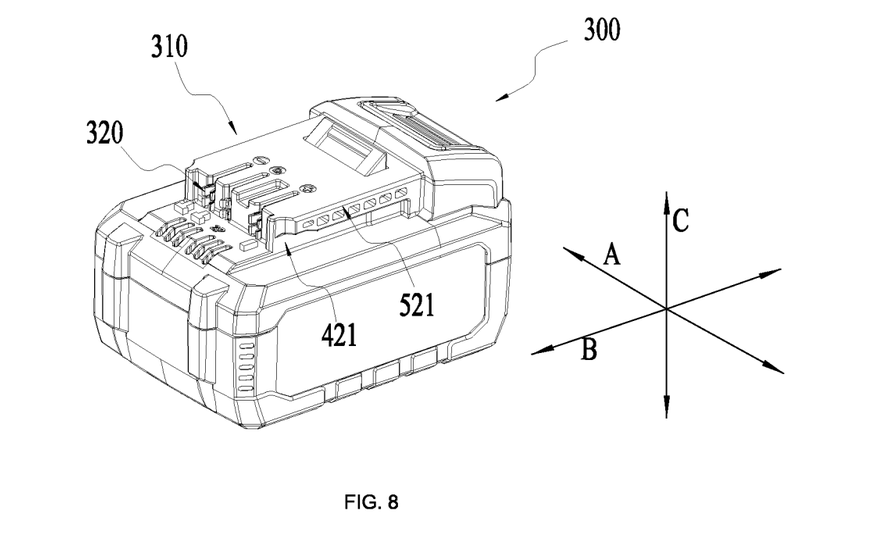
FIG. 8 is a structural view of a battery pack according to the present disclosure.

The electric tool in the example further includes connecting terminals for electrically connecting the battery pack and the body. The connecting terminals include tool terminals 230 shown in FIG. 6 and battery terminals 320 shown in FIG. 8. The tool terminals 230 are disposed on the mounting portion 220, the tool terminals 230 are electrically connected to a control unit, and the battery terminals 320 are disposed on the connecting portion 310. When the battery pack 300 is operated to be inserted into the mounting portion 220 in a preset direction, each battery terminal 230 is electrically connected to a respective tool terminal 320. The tool terminals 230 are arranged on the mounting portion 220 in a transverse direction perpendicular to the preset direction, and similarly, the battery terminals 320 are arranged on a shell of the battery pack in the transverse direction.

The preset direction refers to a plugging direction of the battery pack and refers to the direction shown as A in FIG. 2. The transverse direction is substantially perpendicular to the plugging direction and refers to the direction shown as B in FIG. 2. The longitudinal direction refers to a direction of the body substantially perpendicular to the preset direction and the transverse direction and refers to the direction shown as C in FIG. 2.

In the example, the battery pack 300 is inserted into and extracted from the body in direction A. The battery pack 300 may be configured to be inserted into and extracted from the body in direction B.

Figure 3:
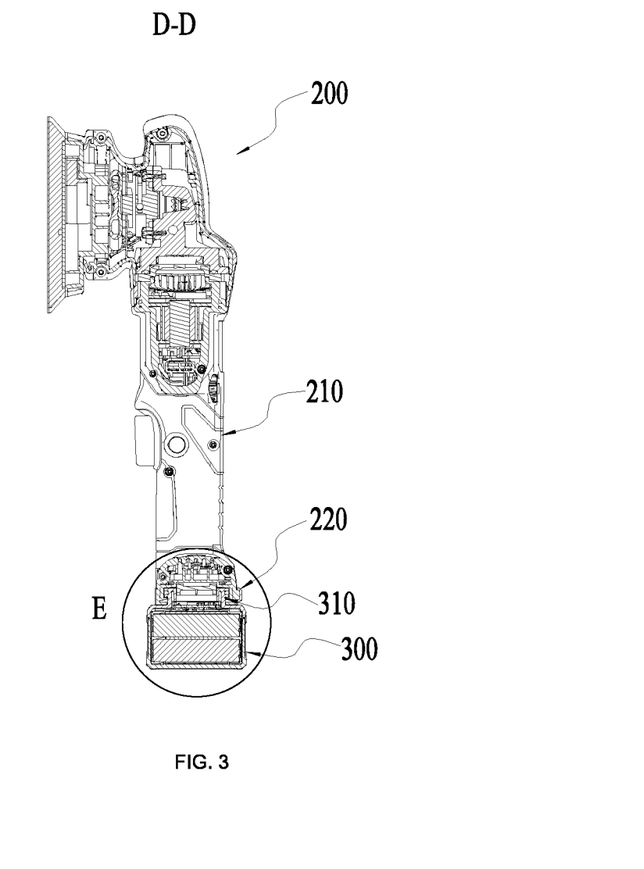
FIG. 3 is a sectional view taken along D-D in FIG. 1.
Figure 4:
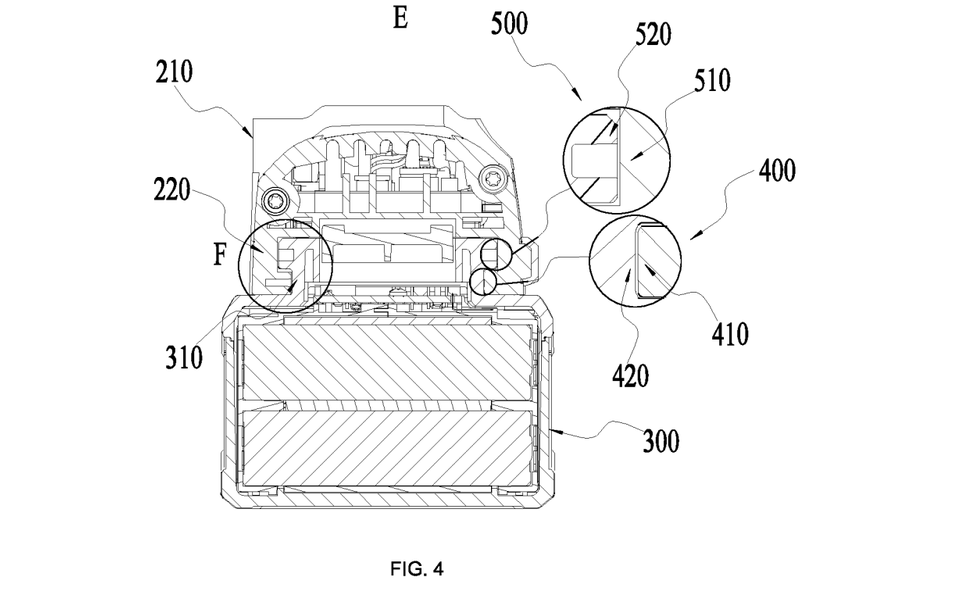
FIG. 4 is a partial enlarged view of part E shown in FIG. 3.

In the example, guide portions are disposed on the mounting portion 220 and the connecting portion 310. The guide portions are configured to guide the battery pack 300 to be mounted on the mounting portion 220. The guide portions include a primary guide unit 400 and a secondary guide unit 500. The primary guide unit 400 and the secondary guide unit 500 each extend in the preset direction, and the primary guide unit 400 and the secondary guide unit 500 each are arranged between the connecting portion 310 and the mounting portion 220 in the longitudinal direction. Referring to FIG. 3 to FIG. 4, the primary guide unit 400 and the secondary guide unit 500 are arranged side-by-side between the connecting portion 310 and the mounting portion 220 in an up-down direction, and the primary guide unit 400 and the secondary guide unit 500 both extend in the preset direction.

The primary guide unit 400 and the secondary guide unit 500 are made of the same material. The primary guide unit 400 and the secondary guide unit 500 each are configured to implement rigid mating. The width of the mating gap between the primary guide units 400 is greater than or approximately equal to 0, and the width of the mating gap between the secondary guide units 500 is greater than or approximately equal to 0.

As shown in FIG. 3 and FIG. 4, in the example, one primary mating surface on the mounting portion 220 and one secondary mating surface on the mounting portion 220 are disposed on different planes, and one primary mating surface on the connecting portion 310 and one secondary mating surface on the connecting portion 310 are disposed on different planes. Being disposed on different planes refers to being not located on the same plane and may refer to being disposed on two planes intersecting each other or may refer to being disposed on two planes parallel to each other.

In the example, the primary guide unit 400 and the secondary guide unit 500 are both guide structures directly formed on the shell of the battery pack 300 and the housing of the body 210, that is, the primary guide unit 400 and the secondary guide unit 500 are made of the same material as the shell and the housing, and the material is specifically a plastic material.

In the example, the guide unit implementing loose fit is directly formed on the housing and on the extending leg of the body and the shell of the battery pack, so that the guide unit can guide the battery pack to be inserted and extracted without the help of springs, resilient washers and other shock absorption structures. Moreover, the shock absorption performance of the battery pack during usage is improved, the wear of the terminals of the battery pack and terminals of the body caused by the vibration of the battery pack relative to the body is reduced, the noise is reduced, and thereby the usage experience of users is improved.

As shown in FIGS. 4 to 7, the primary guide unit 400 includes a pair of primary mating surfaces 430 mating with each other in the transverse direction. The primary mating surfaces 430 include a body primary mating surface 431 located on the mounting portion 220 and a battery primary mating surface 432 located on the connecting portion 310 of the battery pack. The body primary mating surface 431 mates with the battery primary mating surface 432 in the transverse direction during the plugging process and the using process. Mating in the transverse direction refers to mutual restraint and restriction in the transverse direction.

Figure 5:
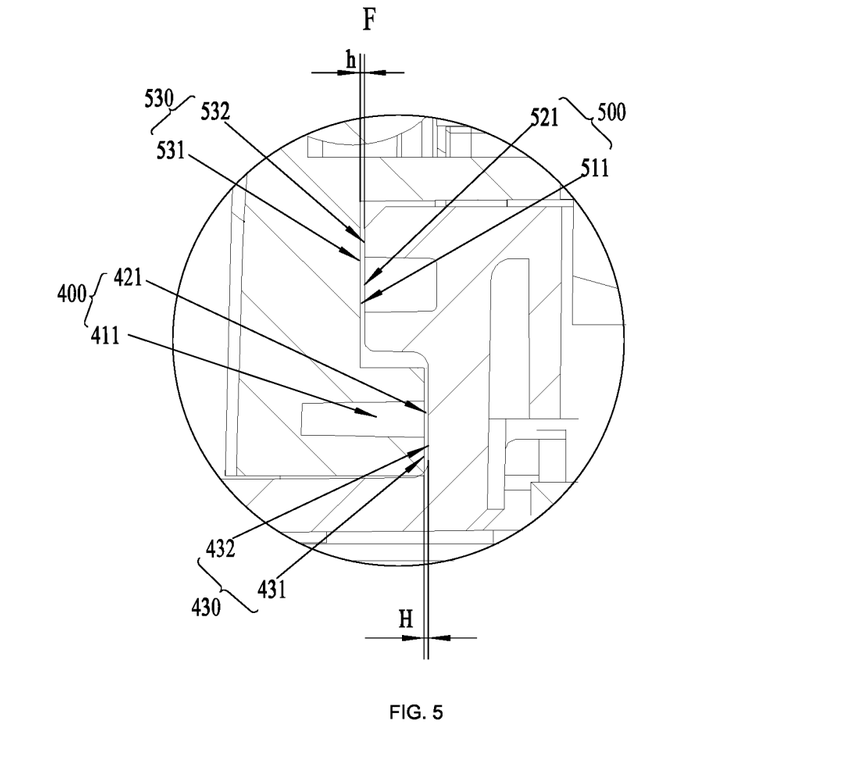
FIG. 5 is an enlarged view of part F shown in FIG. 4.

As shown in FIG. 5, the secondary guide unit 500 includes a pair of secondary mating surfaces 530 mating with each other. The secondary mating surfaces 530 include a body secondary mating surface 531 located on the mounting portion 220 and a battery secondary mating surface 532 located on the connecting portion 310 of the battery pack. The body secondary mating surface 531 mates with the battery secondary mating surface 532 in the transverse direction during the plugging process and the using process.

The fit between the body primary mating surface 431 and the battery primary mating surface 432 may be a clearance fit or a contact fit, and similarly, the fit between the body secondary mating surface 531 and the battery secondary mating surface 532 may be a clearance fit or a contact fit.

As shown in FIG. 4, a pair of primary guide units 400 is provided in the example and is symmetrically disposed on two sides of the connecting terminals in the transverse direction. A pair of secondary guide units 500 is further provided and is symmetrically disposed on two sides of the connecting terminal in the transverse direction.

Referring to FIG. 4, in the example, each primary guide unit 400 includes a body primary guide rail 410 disposed on the mounting portion 220 and a battery female guide rail 420 disposed on the connecting portion 310; each secondary guide unit 500 includes a body female guide rail 510 disposed on the mounting portion 220 and a battery male guide rail 520 disposed on the connecting portion 310.

As shown in FIG. 5, each primary guide unit 400 includes a pair of body male guide rails 410 oppositely disposed on an inner wall of the housing and on the extending leg of the body. The pair of body male guide rails 410 is disposed on two sides of the tool terminals 230 in the transverse direction respectively and on the housing. The body male guide rails 410 are a pair of strip-shaped first protrusions 411 protruding from the inner wall of the housing. Correspondingly, to accommodate the body male guide rails 410, the battery female guide rails 420 include a pair of battery female guide rails 420 disposed on the shell of the battery pack and are open in opposite directions. Each battery female guide rail 420 is specifically a strip-shaped first groove 421, and a pair of first grooves 421 is disposed on two sides of the battery terminals 320 in the transverse direction respectively.

Therefore, in the example, as shown in FIG. 4 to FIG. 5, a transverse outer surface of the first projections 411 constitute the body primary mating surface 431, a bottom surface of the first grooves 421 constitute the battery primary mating surface 432, and the gap between the body primary mating surface 431 and the battery primary mating surface 432 constitutes a transverse mating gap H of the primary guide unit 400.

Figure 7:
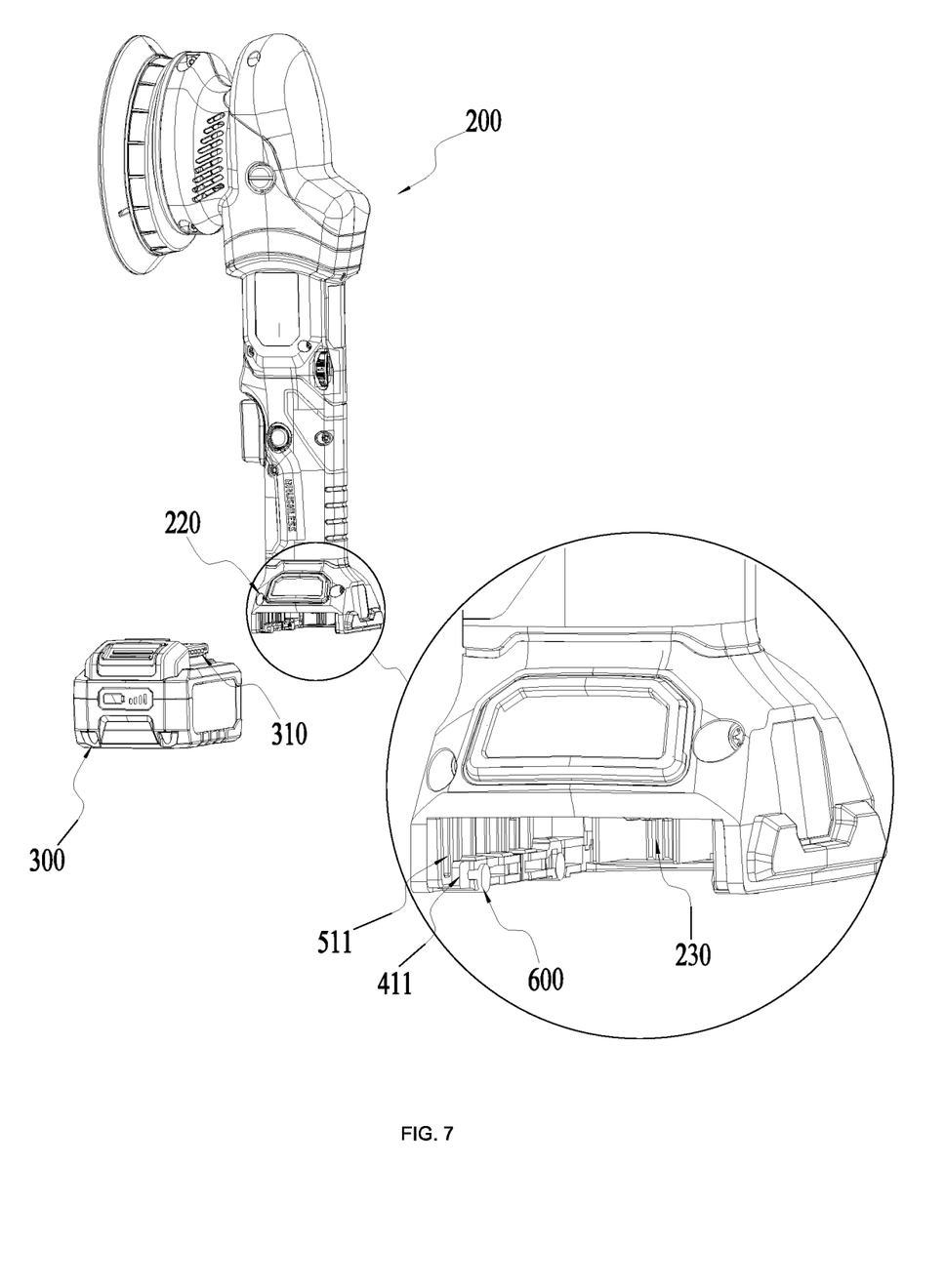
FIG. 7 is a structural view taken at another angle of a mounting portion of a body according to the present disclosure.
Figure 9:
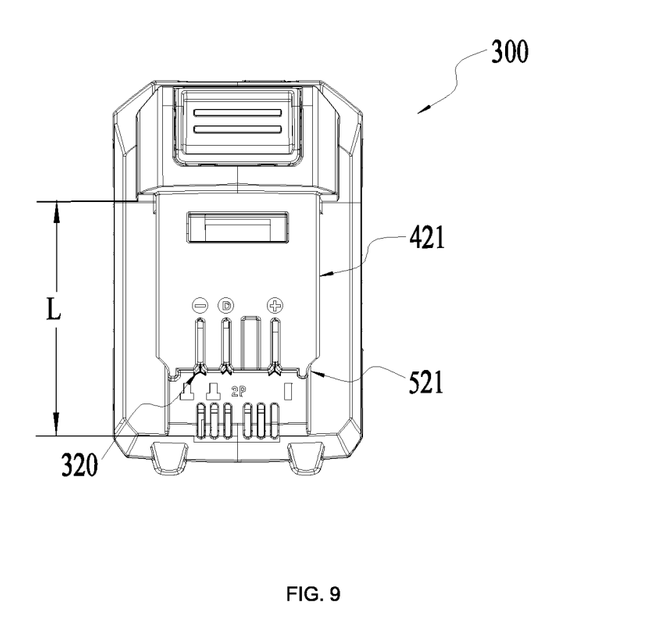
FIG. 9 is a structural view taken at another angle of a battery pack according to the present disclosure.

Referring to FIGS. 6 to 9, in the example, the secondary guide units 500 includes a pair of battery male guide rails 520 disposed oppositely on the shell of the battery pack. Referring to FIG. 9, the pair of battery male guide rails 520 includes second protrusions 521 disposed on the upper sides of the first grooves 421. Correspondingly, to accommodate the battery mail guide rails 520, a pair of body female guide rails 510 is oppositely disposed on the inner wall of the housing and on the extending leg of the body. As shown in FIG. 7, in the example, body female guide rails 510 include a pair of second grooves 511 disposed on the upper sides of the first protrusions 411 and multiple ribs 512 spaced apart and disposed on the bottom walls of the second grooves 511. Each rib 512 extends in the longitudinal direction. Multiple ribs 512 are spaced apart and disposed on the bottom wall of each second groove 511. As shown in FIG. 5 transverse outer surfaces of the ribs 512 constitute the body secondary mating surface 531, and transverse outer surfaces of the second protrusions 521 constitute the battery secondary mating surface 532. A transverse gap between the body secondary mating surface 531 and the battery secondary mating surface 532 constitutes a transverse mating gap h of the secondary guide units 500.

As an alternative example, bottom walls of the body female guide rails 510 may be set as entire-surface structures instead of the rib structures; similarly, the first projections 411 of the body male guide rails 410 may be set to include several ribs extending in a vertical direction rather than be entire-surface structures, which is not limited.

As an alternative example, the second grooves 511 may not be provided with ribs 512, and the bottom walls of the second grooves 511 may mate with the transverse outer surfaces of the second protrusions 521 to constitute the secondary mating surfaces 530.

As shown in FIG. 5, in the case where the width of the transverse gap between the body primary mating surface 431 and the battery primary mating surface 432 is H, and the width of the transverse gap between the body secondary mating surface 531 and the battery secondary mating surface 532 is h, H and h are both greater than or approximately equal to 0 and are less than or equal to 1 mm. In the example, the width of the transverse gap H between the primary mating surfaces is set to 0.1 mm≤H≤1 mm, and H may be set to 0.1 mm, 0.2 mm, 0.5 mm, 1 mm, etc. The width of the transverse gap h between the secondary mating surfaces is set to 0.1 mm≤H≤1 mm, and h may also be set to 0.1 mm, 0.2 mm, 0.5 mm, 1 mm, etc.

The ratio H/h of the width of the transverse gap H between the primary mating surfaces to the width of the transverse gap h between the secondary mating surfaces satisfies that H/h≥0.3; preferably, H/h≥0.5. For example, the width of the transverse gap H between the body primary mating surface 431 and the battery primary mating surface 432 is 0.1 mm, and the width of the transverse gap h between the body secondary mating surface 531 and the battery secondary mating surface 532 is 0.2 mm. In the example, the ratio H/h of the width of the transverse gap H between the primary mating surfaces to the width of the transverse gap h between the secondary mating surfaces satisfies that H/h=1. For example, the width of the transverse gap H between the body primary mating surface 431 and the battery primary mating surface 432 and the width of the transverse gap h between the body secondary mating surface 531 and the battery secondary mating surface 532 are both 0.2 mm.

The ratio of the width of the transverse gap H between the primary mating surfaces 430 to the width of the transverse gap h between the secondary mating surfaces 530 is reasonably set such that the relationship between H and h satisfies the above ratio range. Therefore, on the basis of ensuring the reliability and convenience of assembling the battery pack 300 and the body 200, the vibration of the battery pack 300 in the using process is effectively reduced, and the vibration noise is reduced, so that users may obtain better experience.

In the example, in the case where the length of a plugging stroke of the battery pack in the preset direction is L, and L is shown in FIG. 9, 40≤L/H≤700, and 40≤L/h≤700. The length of the plugging stroke L of the battery pack 300 in the preset direction may be set to 49 mm, or the length of the plugging stroke L of the battery pack 300 in the preset direction may be set to 64 mm.

Different transverse gaps are selected and set according to different plugging strokes, so that it is ensured that battery packs with different plugging strokes bring substantially the same plugging experience. Moreover, the vibration of the battery packs is further restricted by selecting the reasonable values above, and thus the usage experience of users in the mounting and using processes of the battery packs is effectively improved.

In the example, the ratio of the weight of the battery pack 300 to the width of the transverse mating gap is greater than or equal to 0.3 kg/mm and is smaller than or equal to 30 kg/mm. The weight of the battery pack 300 may be selected to be, for example, 300 g, 450 g, 750 g, 3 kg, etc.

An appropriate transverse gap is selected and set according to norms of battery packs, so that the vibration of battery packs with different weights is controlled within a reasonable range. Therefore, excessive wear of the place where the battery pack mates with the body, excessive wear of the connecting terminals and excessive vibration noise which are caused by the vibration of the battery are reduced, better usage experience is brought, and the service life is prolonged.

A resilient member 600 is disposed between the primary mating surfaces. The resilient member 600 is configured to limit displacement of the battery pack in a direction intersecting the preset direction, such as displacement in the transverse direction perpendicular to the preset direction, and displacement in a direction intersecting the preset direction at an angle. The above displacement in a direction intersecting the preset direction is not limited on the same plane.

In the example, the first projection 411 is provided with a resilient member 600 embedded in the first projection 411, and the resilient member 600 may specifically be a resilient pin inserted in the first projection 411 in the transverse direction. Through the setting of the resilient member, the shock absorption effect of the battery pack is improved, which is beneficial to improve the usage experience of users and prolong the service life.

According to the electric tool provided by the present disclosure, the primary guide unit and the secondary guide unit are disposed between the body and the battery pack, and the gap between the mating surfaces of the primary guide unit and the gap between the mating surfaces of the secondary guide unit are reasonably set according to the norms and the plugging stroke of the battery pack. Therefore, on the basis of ensuring the reliability and convenience of assembling the battery pack and the body, the vibration of the battery pack in the using process is effectively reduced, and the vibration noise is reduced, so that users can obtain better experience.

The above illustrates and describes basic principles, main features and advantages of the present disclosure. It is to be understood by those skilled in the art that the above examples do not limit the present disclosure in any form, and solutions obtained by means of equivalent substitution or equivalent transformation fall within the protection scope of the appended claims.

What is claimed is:

1. An electric tool, comprising:
   a body, comprising a housing extending in a longitudinal direction and a mounting portion disposed on an end of the housing, wherein tool terminals are disposed on the mounting portion;
   a battery pack, comprising a connecting portion and battery terminals disposed on the connecting portion, wherein each of the battery terminals is electrically connected to a respective one of the tool terminals when the battery pack is operated to be inserted into the mounting portion in a preset direction, and the battery terminals are arranged on a shell of the battery pack in a transverse direction perpendicular to the preset direction; and a guide portion, formed on the mounting portion and the connecting portion, configured to guide the battery pack to be mounted on the mounting portion;

wherein the guide portion comprises a primary guide unit and a secondary guide unit, the primary guide unit and the secondary guide unit each extend in the preset direction, the primary guide unit and the secondary guide unit each are arranged in the longitudinal direction between the connecting portion and the mounting portion, the primary guide unit and the secondary guide unit each are configured to implement rigid mating, the primary guide unit comprises primary mating surfaces mating with each other in the transverse direction, the secondary guide unit comprises secondary mating surfaces mating with each other in the transverse direction, and a ratio of a width of a transverse gap between the primary mating surfaces to a width of a transverse gap between the secondary mating surfaces is greater than or equal to 0.3.

2. The electric tool according to claim 1, wherein the ratio of the width of the transverse gap between the primary mating surfaces to the width of the transverse gap between the secondary mating surfaces is greater than or equal to 0.5.

3. The electric tool according to claim 1, wherein the primary guide unit and the secondary guide unit are made of a same material.

4. The electric tool according to claim 3, wherein a ratio of a weight of the battery pack to a width of a transverse mating gap is greater than or equal to 0.3 kg/mm and is smaller than or equal to 30 kg/mm.

5. The electric tool according to claim 3, wherein a ratio of a length of a plugging stroke of the battery pack in the preset direction to a width of a transverse mating gap is greater than or equal to 40 and is smaller than or equal to 700.

6. The electric tool according to claim 4, wherein a one of the primary mating surfaces on the mounting portion and a one of the secondary mating surfaces on the mounting portion are disposed on different planes, and a one of the primary mating surfaces on the connecting portion and a one of the secondary mating surfaces on the connecting portion are disposed on different planes.

7. The electric tool according to claim 2, wherein the primary guide unit comprises a body male guide rail disposed on the mounting portion and a battery female guide rail disposed on the connecting portion and the secondary guide unit comprises a body female guide rail disposed on the mounting portion and a battery male guide rail disposed on the connecting portion.

8. The electric tool according to claim 7, wherein the body female guide rail comprises a groove and a plurality of ribs spaced apart on a bottom wall of the groove, each of the plurality of ribs extends in the longitudinal direction, the electric tool further comprises a resilient member disposed between the primary mating surfaces, and the resilient member is configured to limit displacement of the battery pack in a direction intersecting the preset direction.

9. An electric tool, comprising:
a body, comprising a housing extending in a longitudinal direction and a mounting portion disposed on an end of the housing, wherein tool terminals are disposed on the mounting portion;
a battery pack, comprising a connecting portion and battery terminals disposed on the connecting portion, wherein each of the battery terminals is electrically connected to a respective one of the tool terminals when the battery pack is operated to be inserted into the mounting portion in a preset direction and the battery terminals are arranged on a shell of the battery pack in a transverse direction perpendicular to the preset direction; and
a guide portion, formed on the mounting portion and the connecting portion, configured to guide the battery pack to be mounted on the mounting portion;
wherein the guide portion comprises a primary guide unit and a secondary guide unit, the primary guide unit and the secondary guide unit each extend in the preset direction, the primary guide unit and the secondary guide unit each are arranged in the longitudinal direction between the connecting portion and the mounting portion, the primary guide unit and the secondary guide unit each are configured to implement rigid mating, the primary guide unit comprises primary mating surfaces mating with each other in the transverse direction, the secondary guide unit comprises secondary mating surfaces mating with each other in the transverse direction, and a width of a transverse gap between the primary mating surfaces and a width of a transverse gap between the secondary mating surfaces each are greater than or approximately equal to 0 and are smaller than or equal to 1 mm.

10. The electric tool according to claim 9, wherein a ratio of the width of the transverse gap between the primary mating surfaces to the width of the transverse gap between the secondary mating surfaces is greater than or equal to 0.5.

11. The electric tool according to claim 9, wherein a ratio of a weight of the battery pack to a width of a transverse mating gap is greater than or equal to 0.3 kg/mm and is smaller than or equal to 30 kg/mm.

12. The electric tool according to claim 9, wherein a ratio of a length of a plugging stroke of the battery pack in the preset direction to a width of a transverse mating gap is greater than or equal to 40 and is smaller than or equal to 700.

* * * * *